United States Patent
Cirit et al.

(10) Patent No.: US 10,148,357 B1
(45) Date of Patent: Dec. 4, 2018

(54) CONFIGURABLE LASER MODULATOR DRIVER AND OUTPUT MATCHING NETWORK

(71) Applicant: INPHI CORPORATION, Santa Clara, CA (US)

(72) Inventors: Halil Cirit, Burlingame, CA (US); Karthik Gopalakrishnan, Santa Clara, CA (US); Karim Abdelhalim, Newport Coast, CA (US); Jorge Pernillo, Daly City, CA (US); Lawrence Tse, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/604,196

(22) Filed: May 24, 2017

(51) Int. Cl.
*H04B 10/50* (2013.01)
*H04B 10/27* (2013.01)

(52) U.S. Cl.
CPC ........... *H04B 10/27* (2013.01); *H04B 10/505* (2013.01)

(58) Field of Classification Search
CPC .................................................. H04B 10/504
See application file for complete search history.

(56) References Cited

U.S. PATENT DOCUMENTS

2003/0086455 A1* 5/2003 Ciubotaru ............. H01S 5/0427 372/38.02
2012/0301151 A1* 11/2012 Hu ......................... H04B 10/40 398/135
2015/0280397 A1* 10/2015 Fingerle ............... H01S 5/0428 372/29.012

OTHER PUBLICATIONS

Application Note: "Interfacing Maxim Laser Drivers with Laser Diodes", Maxim Integrated, May 2000.*
Galal et al., "10-Gb/s Limiting Amplifier and Laser/Modulator Driver in 0.18-um CMOS Technology", IEEE Journal of Solid-State Circuits, vol. 38, No. 12, Dec. 2003.*

* cited by examiner

*Primary Examiner* — Shi K Li
(74) *Attorney, Agent, or Firm* — Richard T. Ogawa; Ogawa P.C.

(57) ABSTRACT

Non-ideal downstream loading of a differential driver in a single ended circuit driving a communications laser—e.g., Electro absorption Modulated Laser (EML)—may be compensated by deploying a second matching network at the non-functional (terminated) driver output node. Certain embodiments may further compensate for distortion arising from circuit non-ideality, by introducing a laser replica downstream of the second matching network to mimic electrical properties of the laser. Embodiments may sufficiently compensate for downstream circuit non-ideality to allow replacing the bulky choke inductor of a bias tee, with a resistor. Substituting a resistor for a more complex inductor structure can simplify design and fabrication of the single-ended driver circuit, and also reduce footprint by eliminating area formerly occupied by the choke inductor. Embodiments may be particularly suited to bridge integration with other system components undergoing design migration toward double-ended modulator circuit architectures featuring a differential driver.

17 Claims, 4 Drawing Sheets

CONFIGURABLE LASER MODULATOR DRIVER AND OUTPUT MATCHING NETWORK

BACKGROUND

Embodiments of the present invention are directed to communication systems.

Over the last few decades, the use of communication networks has increased dramatically. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs. For high-speed data communication applications, pulse-amplitude modulation (PAM) technique is often used.

Over the past, there have been many types of communication systems and methods. Unfortunately, they have been inadequate for various applications. More specifically, non-ideality in driver circuit behavior can adversely influence the speed and accuracy of signal transmission. Therefore, improved systems and methods are desired.

SUMMARY

Non-ideal downstream loading of a differential driver in a single ended circuit driving a communications laser (e.g., Electro absorption Modulated Laser—EML), may be compensated for with a second matching network at the non-functional (terminated) driver output node. Certain embodiments may further compensate for distortion arising from circuit non-ideality, by introducing a laser replica downstream of the second matching network to mimic electrical properties of the laser. Some embodiments may provide bias voltage utilizing a bias tee. Other embodiments may sufficiently compensate for downstream circuit non-ideality to allow (optionally) replacing the bulky choke inductor of a bias tee, with a resistor instead. Substituting a resistor for a more complex inductor structure can simplify design and fabrication of the single-ended driver circuit, and also reduce footprint by eliminating area formerly occupied by the choke inductor. Embodiments may be particularly suited to bridge integration with other system components undergoing design migration toward double-ended modulator circuit architectures featuring a differential driver.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
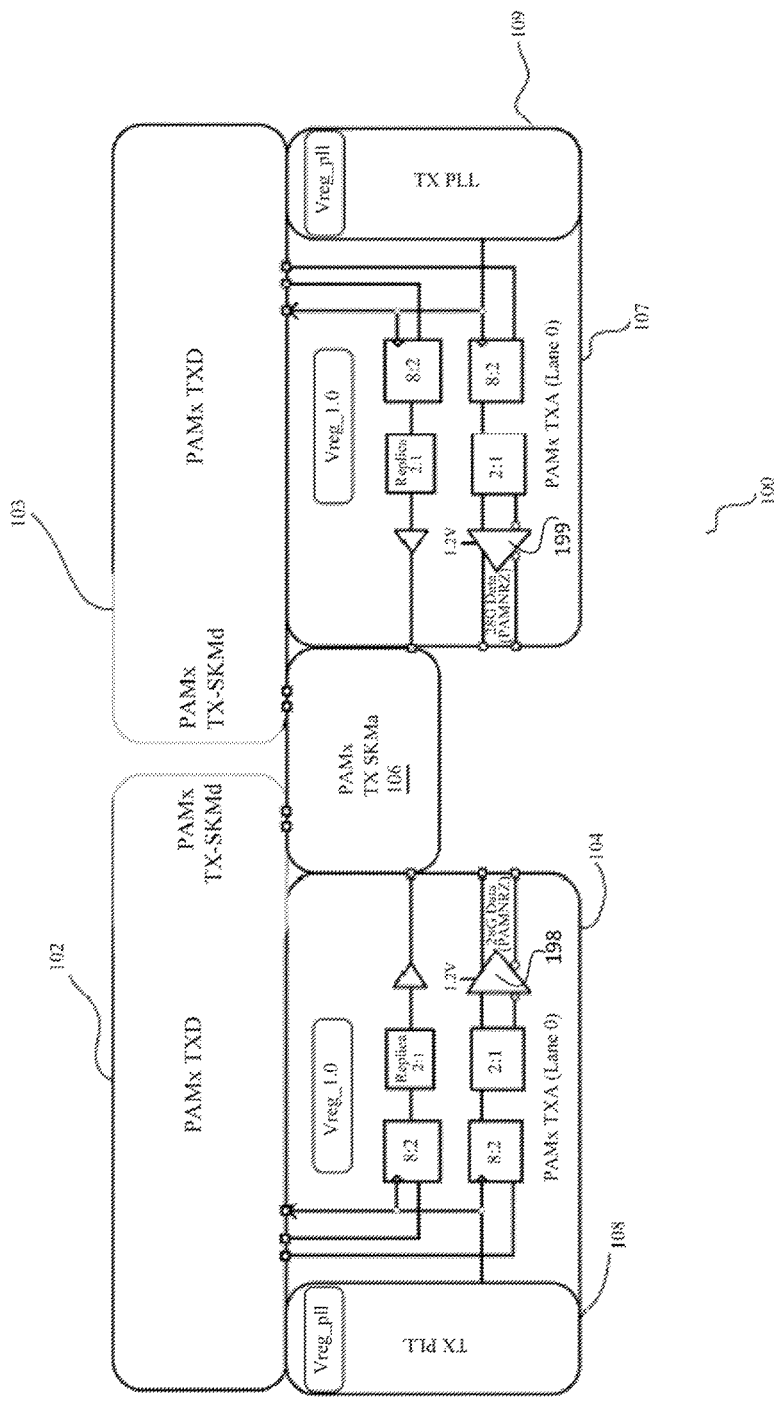
FIG. 1 is a simplified diagram illustrating a PAM communication system according to an embodiment.

FIG. 1 is a simplified diagram illustrating a PAM communication system 100 according to an embodiment of the present invention. This diagram is merely an example, which should not unduly limit the scope of the claims. One of ordinary skill in the art would recognize many variations, alternatives, and modifications. As shown in FIG. 1, data are transmitted between communication module 104 and communication module 107. More specifically, communication module 104 works in conjunction with module 102 and PLL 108; communication module 107 works in conjunction with module 103 and PLL 109. When communication module 104 transmits data to communication module 107 (or vice versa), a skew management module 106 is also used to facilitate data alignment. For example, two 8-bits data lanes are combined to provide a 16-bits data lane, and module 106 facilitates the alignment of two lanes.

The TXD modules 102 and 103 provide digital functions. In a specific embodiment, each of the TXD modules is used for receiving a 2 sets of 40 bit data word (MSB and LSB) and serializing it to 2 sets of 8 bits, as required for NRZ or PAM4 modes. Additionally, TXD modules generate the word clock output to the core logic. The TXD modules 102 and 103 are also responsible for the managing the skew on the high-speed data transmission across dual-NRZ streams, in conjunction with the skew management module 106. In various implementations, the TXD modules 102 and 103 also implement all the Management Data Input/Output (MDIO) registers for the TX as well as providing overrides for all the voltage regulators and TX PLL configuration and status. For example, the PAM communication system includes a MDIO for providing serial data communication.

The TXA modules 104 and 107 are configured to provide mixed digital and analog functions, which include serializing MSB and LSB parallel 8-bits wide words into a serial bit stream. For example, when serializing MSB and LSB words, skew management module 106 helps aligning the MSB and LSB words, details of which are provided below. In certain implementations, TXA modules 104 and 107 are configured to drive a 100Ω differential load in PAM4 mode, and they are adapted to apply the pre and post cursor data. When operating in NRZ mode, the TXA modules provide similar functions on the MSB stream, and the LSB stream is used to carry data (clock-patterns) for skew management (if enabled).

The PLL modules 108 and 109 provide clock signals. For example, the PLL modules use a clock recovered from the receiver as a reference to generate the 14G 2-phase clocks needed for the TXA modules. In various implementations, the reference clock for the TX PLL modules 108 and 109 is primarily the recovered clock from the partnered transceiver. This keeps the transmission frequency locked to the frequency of incoming data, which may be asynchronous to local reference frequency. For example, PLL module 108 and 109 generate two phases of 2UI clock for the TXA modules, where each phase is offset by 1UI. The TXA module output divided 8UI clock to the TXD modules, which in turn generate a 40UI clock output to the core used to generate new "data_in" data for transmission. TXD modules 102 and 103 provide the first stage of interleave and generates 8-bits wide data to the TXA modules, where the final 8:1 interleave is performed before transmission. TXA modules 104 and 107 also provide a finite impulse response (FIR) function for line equalization, with pre and post cursor compensation levels set from registers contained in TXD modules. In certain implementations, TXD modules comprise fuse-able registers for providing trimming of the voltage regulators, phase tuning of the clocking and output impedance of the TXA.

As shown in FIG. 1, the physical placement of the TXD logic (e.g., TXD modules 102 and 103) in the transmitter means that the signals between the TXD and the core logic need to be re-buffered through a "routing channel" to maintain acceptable slew rates over the routing distance. This is also true of signals running between the TXD modules 102 and 103 and the TX PLL module 108 and 109. According to an exemplary implementation, signals between TXD modules and TXA modules have critical 3.5 GHz timing and the placement is such that these can be routed directly. For example, logic of the TXD modules 102 and 103 can be used in multiple transmitter topologies for different implementations, and the routing channels can be created in separate levels of hierarchy to allow different routing to be accommodated while keeping the substantially the same TXD layout as shown in FIG. 1. In a specific embodiment, a "tx_routing" cell is used to contain buffers and signal routing between the TXD modules and the core logic. A "tx_pll routing" cell is provided to contain the buffering between the TXD modules and the TX PLL modules. A "tx_txd_pnr" cell is used at the transmission level as a wrapper round the "tx_txd" digital logic and the two routing channels.

Figure 2:
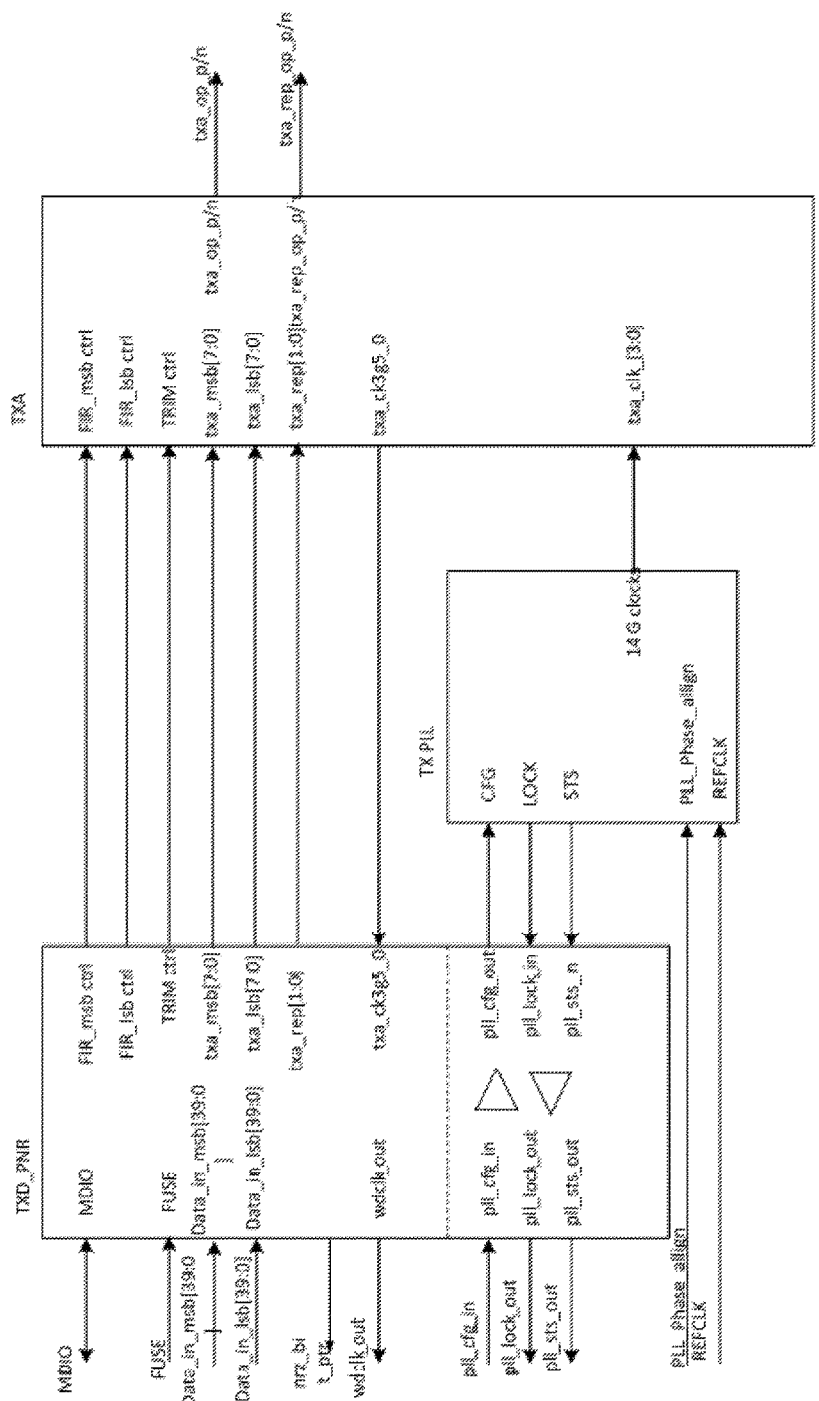
FIG. 2 is a simplified diagram illustrating a transmitter according to an embodiment.

FIG. 2 is a simplified diagram illustrating a transmitter according to an embodiment of the present invention. This diagram is merely an example, which should not unduly limit the scope of the claims. One of ordinary skill in the art would recognize many variations, alternatives, and modifications. As can be seen in FIG. 2, the TXD module provides digital control signals for the TXA module, and clock signal is provided by the TX PLL module.

A primary function of the TXD is to capture 2 pairs of 40-bit wide data from the core logic, MSB (e.g., Data_in_msb[39:0]) and LSB (e.g., Data_in_lsb[39:0]), and multiplex this down to 2 pairs of 8-bit wide data for final transmission by the TXA circuit in PAM4 mode. A "word clock" ("wdclk_out") signal is generated to provide new data from the core by dividing the high speed txa_ck3g5_0 clock from the TXA. In a specific embodiment, different dividing ratios are used at different transmit line rates to maintain the wdclk_out work clock at approximately 700 MHz. In addition to the mission mode divider, a clock control module is used to generate a fixed number of clock pulses in ATPG mode to support at-speed transition fault testing.

During a PAM4 transmission mode, the TXD module generates 2 separate 8-bits data patterns, "txa_msbdata" and "txa_lsbdata". During an NRZ mode TXD, if the skew management is disabled, the MSB data path is used to multiplex the pattern from the core "msbdata_in [39:0]" down to the 8-bit output on "txa_msbdata" and the LSB data path is powered down. If, however, the skew management function is enabled, the LSB data path carries data from the skew management pattern generator.

As seen in FIG. 2, the TXD module contains a block of MDIO addressable registers for configuration and control of both the TXD and TXA modules. In certain embodiments, many aspects of the TXA module are fuse trimmed, and each trim value is also override-able with an MDIO register. In various implementations, the PLL module to generate the high speed TXA clocks (e.g., 14 GHz clock). As shown, configuration and status buses for TX PLL module are routed through TXD to provide buffering and isolation from the core logic and enable the loading to be checked.

Returning to FIG. 1, communication system 100 shows each TXA module 104, 107 including a corresponding driver 198, 199 providing an electrical signal. That electrical signal drives an Electro Absorption Modulated Laser (EML) to output an optical signal for transmission.

According to embodiments, non-ideality in circuit loading downstream of a single-ended differential driver of a communications laser—e.g., an Electro absorption Modulated Laser (EML)—may be compensated for with a second matching network located on the non-functional (terminated) driver output node. Certain embodiments may further compensate for distortion arising from circuit non-ideality, by introducing a laser replica downstream of the second matching network to mimic electrical properties of the laser. Embodiments may sufficiently compensate for circuit non-ideality downstream of the driver, to (optionally) allow replacing a bias tee's bulky choke inductor, with a resistor. This substitution can substantially simplify design and fabrication of the single-ended driver circuit, reducing footprint by eliminating area formerly consumed by the choke inductor.

Figure 3:
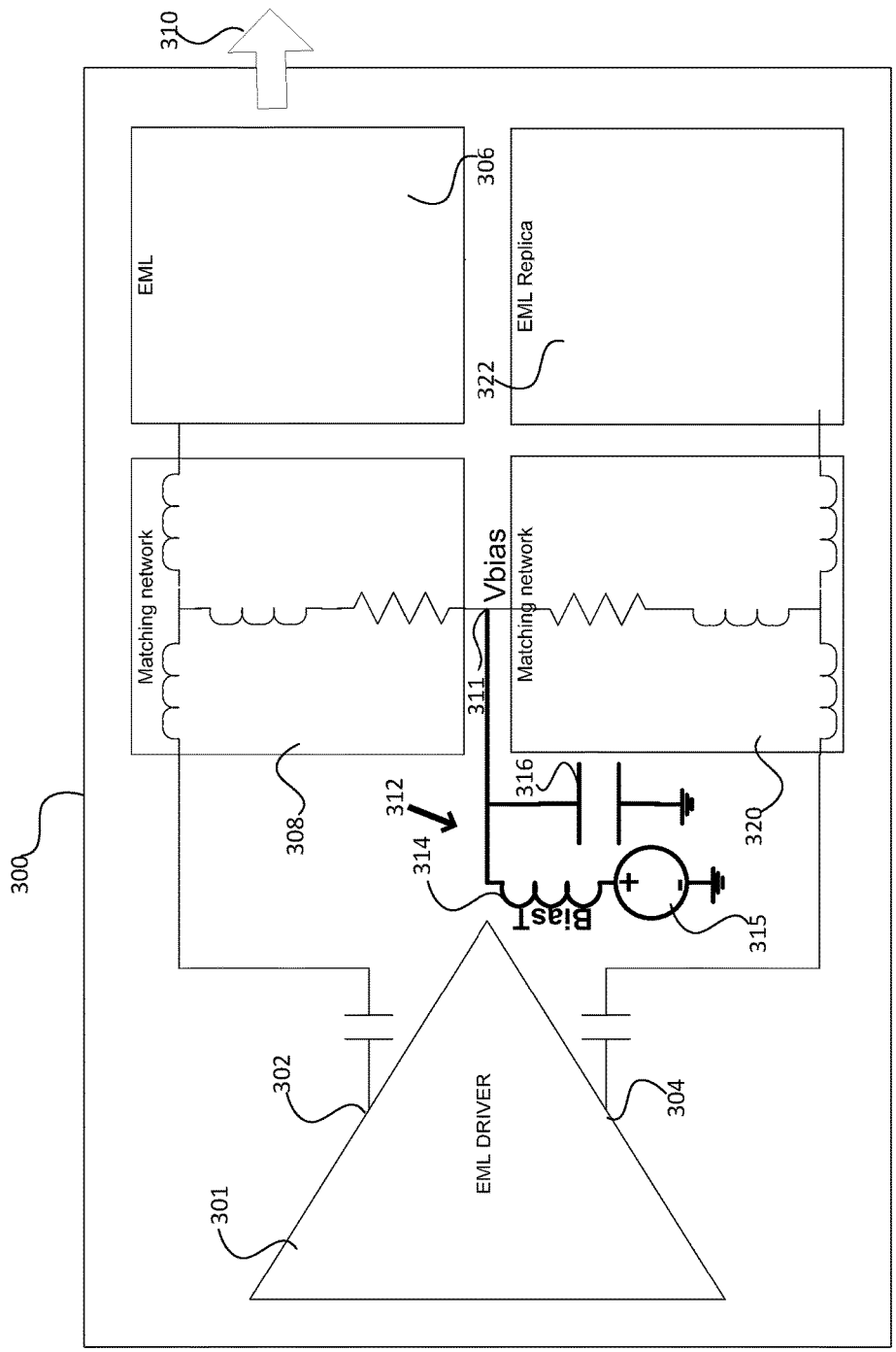
FIG. 3 shows a simplified view of a single-ended differential driver circuit according to an embodiment.

FIG. 3 shows a simplified view of a circuit 300 comprising a differential EML driver 301 having output nodes 302, 304. First output node 302 is in electrical communication with an EML 306 via a first matching network 308. In response to electrical signals received from the driver by way of the first matching network, the EML transmits an optical output 310.

According to certain embodiments, the differential EML driver may be implemented as a buffer.

Here, the circuit 300 shown in FIG. 3 is a single-ended. That is, unlike the first output node 302, the second output node 304 of the EML driver does not communicate an electrical signal forming the basis for generating an optical output.

Accordingly, the electrical output of the second node 304 is terminated. To accomplish such termination in a stable manner without disturbing operation of the first matching network, a bias node (Vbias) 311 is provided for the first matching network and for the second output node of the driver.

In the specific embodiment of FIG. 3, the bias node 311 is in communication with an output of a bias tee (biasT) structure 312. In particular, the biasT comprises a high inductance choke inductor 314 receiving the output of a power supply 315, and a filter capacitor 316.

The choke inductor of the biasT structure serves to ensure the presence of a DC voltage from the power supply. The filter capacitor of the biasT structure serves to filter the DC voltage to a desired level for operation of the laser.

While FIG. 3 shows the bias tee as comprising a grounded capacitor in parallel with the choke inductor, this is not required. Alternative embodiments could feature a bias tee structure having a filter capacitor in an alternative configuration.

In order to further stabilize the Vbias node during operation of the EML, embodiments provide a second matching network 320 at the second output of the EML driver. This second matching network is specifically designed to offer electrical characteristics (e.g., impedance) that closely resemble those offered by the first matching network as it operates with the EML.

The single-ended circuit 300 of FIG. 3 optionally further includes an EML replica 322 in communication with the second matching network. This EML replica offers electrical characteristics mimicking those of the operating EML itself. For example, the EML replica may feature a capacitive component offering capacitance properties similar to that of the laser. In such a manner, the EML replica thus further allows the second matching network to experience voltages, currents, and impedances similar to those encountered by the first matching network.

As a result of this architecture deploying a second matching network and/or EML replica at the second output node of the differential EML driver, the Vbias node ultimately experiences desirable symmetrical electrical properties serving to stabilize its voltage. In this manner, fluctuations in bias level occurring at the Vbias node are moderated, despite the asymmetrical, single-ended application of the differential driver to drive a single EML.

FIG. 3 shows a specific arrangement of elements (e.g., resistors and inductors) making up the first (and second) matching networks. However, this particular arrangement of elements for the matching network(s) is not required, and embodiments are not limited to any particular matching network.

Moreover, while FIG. 3 shows the first and second matching networks as including duplicated elements, this is also not required. According to various embodiments, the specific matching networks present at the active and terminated nodes of the differential driver, may differ from one another.

One property of a single ended circuit for a differential EML driver which may be improved according to embodiments, is analog distortion. In particular, analog distortion may be characterized by Ration of Level Mismatch (RLM). RLM is a metric of distortion which indicates departure of an optical signal eye diagram from an ideal shape.

Another property of an EML driver circuit which may be improved through the introduction of a second matching network and/or EML replica, is signal-to-noise and distortion ratio (SNDR).

It is noted that the design of optical modulator circuits may be undergoing migrating from single-ended architectures, to double-ended architectures specifically leveraging differential voltage schemes. Until such evolution is complete, single-ended modulator circuits featuring differential drivers terminated according to embodiments, may be deployed.

That is, the stable, balanced voltages experienced at both nodes of the differential driver according to embodiments, facilitates integration with other system components—i.e., components of future expected future double-ended modulator circuit designs featuring differential drivers.

A second matching network and/or EML replica introduced according to embodiments, may impart sufficient stability to the Vbias node to allow a reduction in the strength of electrical characteristics (e.g., inductance, capacitance) exhibited by various system components. This in turn may desirably allow reduction in device size, and a smaller circuit footprint.

Moreover, deployment of the second matching network and/or EML replica according to embodiments, may be so effective at reducing Vbias fluctuation, that the choke inductor of the bias tee may (optionally) be entirely replaced with a resistor instead. Such an alternative embodiment is shown in FIG. 4.

Figure 4:
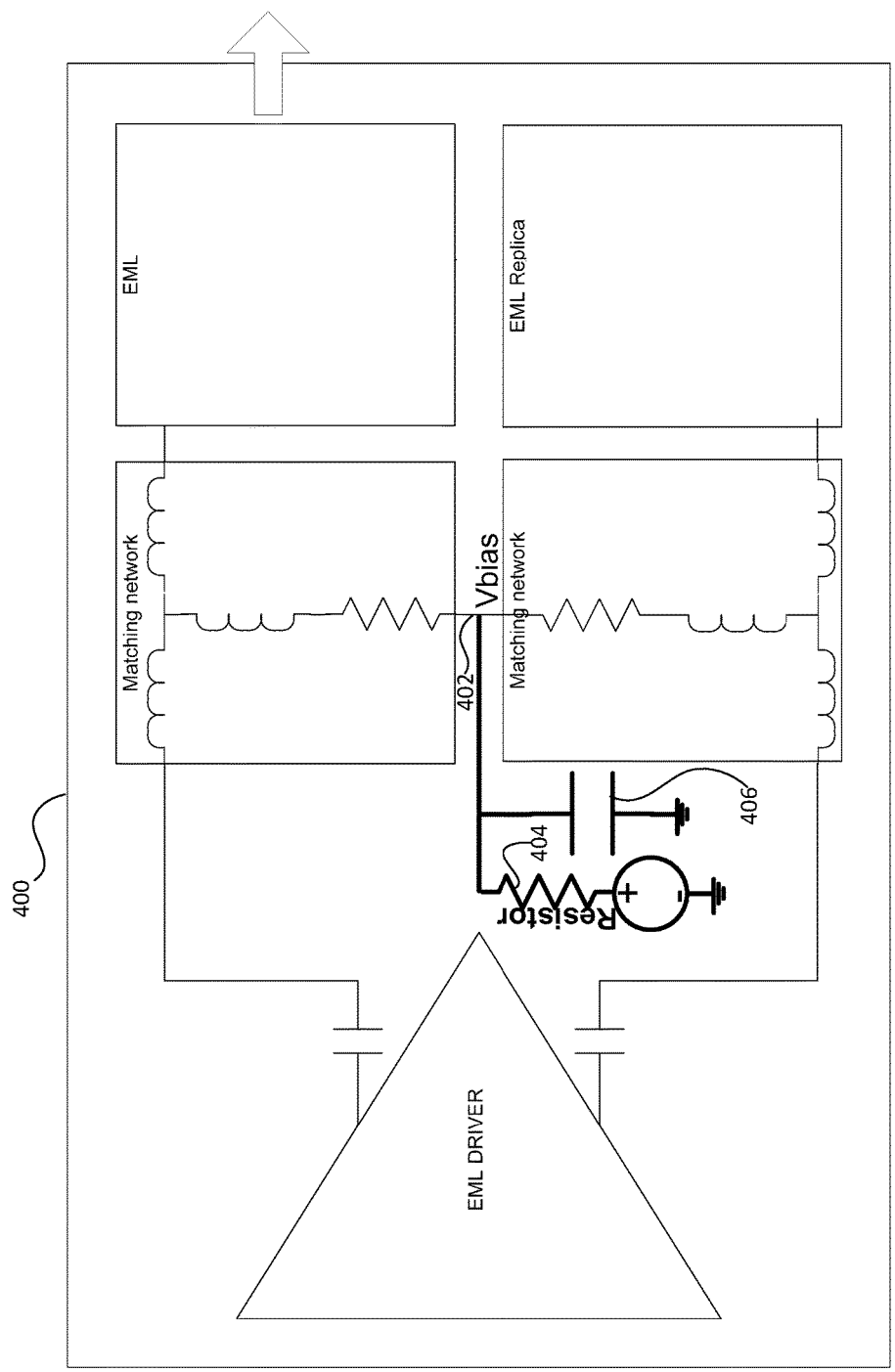
FIG. 4 shows a simplified view of a single-ended differential driver circuit according to another embodiment.

FIG. 4 shows an alternative embodiment of a circuit 400 for a differential EML driver that is again configured to produce a single-ended output. Here, however, the Vbias node 402 is in communication with a resistor 404 rather than an inductor, arranged in parallel with the grounded capacitor 406.

In particular, the elimination or reduction of non-ideal circuit behavior offered by the second matching network and EML replica in the embodiment of FIG. 4, sufficiently reduces the need for the substantial DC voltage stabilization traditionally performed by a bias tee structure. Accordingly, the complex, area-consuming choke inductor component of the biasT may be replaced with a simple resistor.

Such elimination of the inductor structure conserves significant space on the substrate, desirably reducing device footprint. In addition, the resistor structure is simpler to fabricate and integrate into device operation than the more complex high inductance inductor component of a bias T structure.

While the above is a full description of various embodiments, various modifications, alternative constructions and equivalents may be used. Therefore, the above description and illustrations should not be taken as limiting the scope of the present invention which is defined by the appended claims.

What is claimed is:

1. A communications system comprising:
   a differential driver having an active output node and a terminated output node;
   a bias node in communication with a voltage source;
   a first matching network having,
      a first node in communication with the active output node,
      a second node in communication with the bias node, and a third node in communication with a laser; and a second matching network having,
- a first node in communication with the terminated output node,
- a second node in communication with the bias node, and
- a third node in electrical communication with a laser replica, wherein the laser replica comprises a capacitor.

2. The system of claim 1 wherein the laser comprises an electro absorption modulated laser (EML).

3. The system of claim 1 wherein the second matching network duplicates elements of the first matching network.

4. The system of claim 1 wherein the second matching network includes different elements from the first matching network.

5. The system of claim 1 further comprising a bias tee having,
- a first node receiving voltage from the voltage source and in communication with an inductor;
- a second node in communication with a capacitor in parallel with the inductor; and
- a third node in communication with the bias node.

6. The system of claim 5 wherein the second node of the bias tee is grounded.

7. The system of claim 1 further comprising:
- a resistor positioned between the voltage source and the bias node; and
- a capacitor in parallel with the resistor.

8. The system of claim 7 wherein the capacitor in parallel with the resistor is grounded.

9. The system of claim 1 wherein the differential driver comprises a buffer.

10. A method comprising:
- in a single-ended laser driver circuit, providing a first matching network at a terminated output of a differential driver to stabilize a bias voltage at a second matching network present between an active output of the differential driver and a laser; and
- placing an output node of the first matching network in communication with a laser replica, wherein the laser replica comprises a capacitor.

11. The method of claim 10 further comprising:
providing the bias voltage from a voltage supply through a bias tee.

12. The method of claim 10 further comprising:
providing the bias voltage from a voltage supply through a resistor in parallel with a capacitor.

13. The method of claim 12 wherein the capacitor in parallel with the resistor is grounded.

14. The method of claim 10 wherein the second matching network duplicates elements of the first matching network.

15. The method of claim 10 wherein the second matching network includes different elements from the first matching network.

16. The method of claim 10 wherein the differential driver comprises a buffer.

17. A communications system comprising:
- a differential driver having an active output node and a terminated output node;
- a bias node in communication with a voltage source;
- a first matching network having,
  - a first node in communication with the active output node,
  - a second node in communication with the bias node, and
  - a third node in communication with a laser;
- a second matching network having,
  - a first node in communication with the terminated output node, and
  - a second node in communication with the bias node; and
- a bias tee having,
  - a first node receiving voltage from the voltage source and in communication with an inductor,
  - a second node in communication with a capacitor in parallel with the inductor, and
  - a third node in communication with the bias node.

* * * * *